April 6, 1965   C. MUELLER   3,176,695
DEVICE FOR GROOMING NAILS OF ANIMALS
Filed Aug. 29, 1961
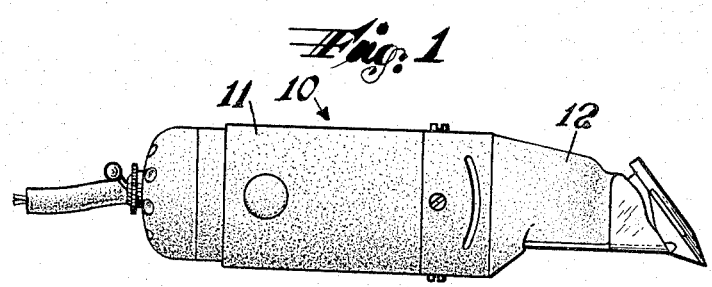
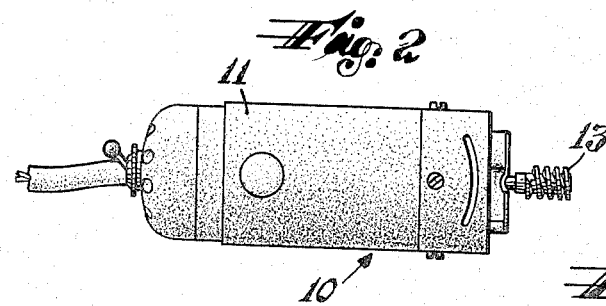
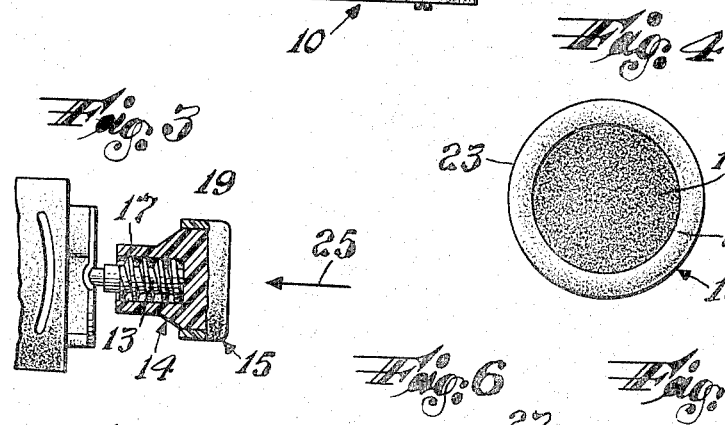
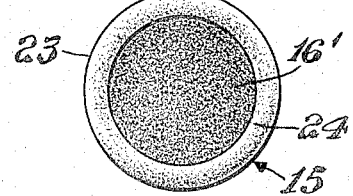
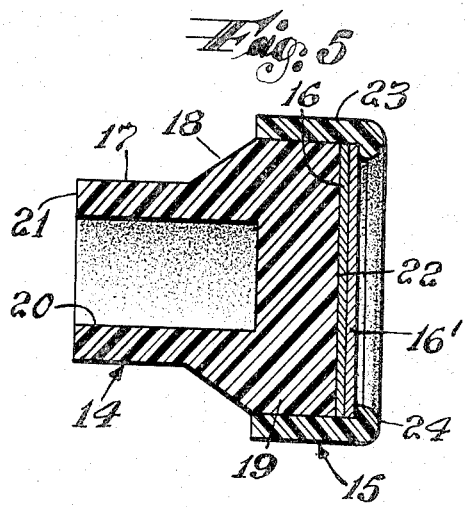
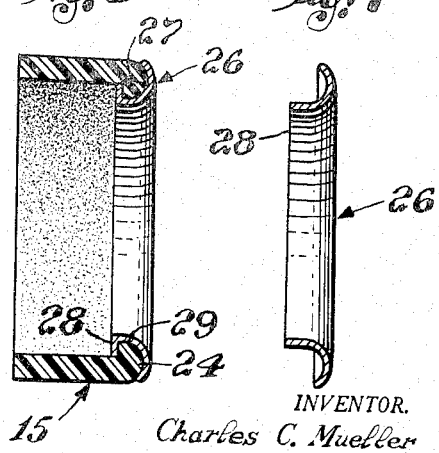
INVENTOR.
Charles C. Mueller
BY 3,176,695
DEVICE FOR GROOMING NAILS OF ANIMALS
Charles Mueller, Cozy Lake Road, Oak Ridge, N.J.
Filed Aug. 29, 1961, Ser. No. 134,771
1 Claim. (Cl. 132—75.8)

This invention relates to a device for grooming nails of animals, especially dogs.

When attending to the needs, for instance, of dogs, difficulties are encountered in the grooming of nails. It is an object of the present invention to overcome the known difficulties.

Another object of this invention is to provide a simple and inexpensive device for the intended purpose.

An important object of my invention is to make it possible to provide a grooming device that can be driven by a motor, and associated with this object is the aim to provide a grooming device that can be operated and driven with the aid of existing means.

To the accomplishment of the foregoing and such other objects as will appear hereinafter, my invention consists in the elements of my device and their relation one to the other, as is described in detail in the specification which is accompanied by a drawing in which:

FIG. 1 shows a clipper as is used for clipping of dogs and often larger animals by veterinarians, for surgical shaving, etc.;

FIG. 2 shows the motor part of the same clipper, with the cutter head removed;

FIG. 3 shows a fragmentary portion of the part of FIG. 2, with the device of the invention operably attached thereto, the device being shown partially sectioned;

FIG. 4 is a plan view of the device of the invention, drawn to enlarged scale, viewed in the direction of the arrow indicated in FIG. 3;

FIG. 5 shows my device in longitudinal section, drawn to enlarged scale;

FIG. 6 is a sectional view of an element of the device of FIGS. 3 to 5 in modified form, constituted by two parts; and FIG. 7 shows one of the parts of the modified element of FIG. 6 in disassembled condition.

Referring to the drawing in greater detail, and initially to FIGS. 1 and 2, a hair clipper generally designated 10 consists of a main body or the motor part 11 and a cutter head 12 which is detachable. Projecting from the motor part is a worm 13 which gears with teeth (not shown) in the cutter head to operate the hair-cutting teeth of the cutter head. The clipper as shown in FIGS. 1 and 2 and so far described forms no part of the invention.

The device of the invention consists of a body 14, a flanged ring 15, and, for instance, two sanded disks 16 and 16′, these parts being most clearly shown in FIG. 5.

The body 14 comprises a cylindrical part 17, a tapering part 18, and another cylindrical part 19, and is provided with a cavity 20 which opens in the end face 21 of the body and terminates short of the end face 22. The cavity is of cylindrical shape and extends in the direction of the longitudinal axis of the body 14. The flanged ring 15 is formed by a ring proper 23 having at one end an inwardly turned flange 24. Seated on the end face 22, and held in place by the ring 23 and flange 24, are the sanded disks 16, 16′, one upon the other.

In FIG. 5, the body 14, the flanged ring 15, and the disks 16, 16′ are shown in assembled condition. In order to assemble these elements, the disks 16, 16′ are placed upon the face 22, with the sand-covered surface of the outer disk outwardly directed, and the ring 15 is pushed over the cylindrical part 19 of the body in the direction of the arrow 25 (see FIG. 3). In the assembled condition, the sanded disks appear sandwiched between the end face 22 and the flange 24. From FIG. 4 it will be seen that the side of the outer disk 16′, that is covered with sand, looks outwardly.

The body 14 is made in any suitable way of resilient material, for instance, rubber, plastics, such as polyethylene, polystyrene, polyvinyl chloride, nylon. It is an important feature of my invention to use resilient material for the body 14 and to provide a cavity, such as the cavity 20, of such dimensions that the worm 13 will be able to act as a drive and will rotate the assembled device of the invention, when in operating condition as shown in FIG. 3. For this purpose, it is only necessary to provide a cavity which will require the body 14 to be forced over the worm 13. I have operated my device, using for its operation a small clipper as shown in FIGS. 1 and 2, with great success.

While the body 14 is shown to consist throughout of a plastic material, it will be appreciated that it is only the cavity-defining wall that must be resilient. The body could consist, for instance, of metal, if provided with a sleeve of resilient material to constitute the cavity-defining wall.

The flanged ring may be made of any material but I prefer to make it of resilient material. When employing resilient material, nothing but proper dimensioning of the cylindrical part 19 of the body 14 and the flanged ring 15 is needed to ensure a tight fit of the contacting surfaces. If materials other than resilient ones are used, connecting means are provided to ensure that the contacting parts will not unintentionally separate.

In order to use my assembled device, it is simply pushed over the worm of the clipper shown and is then ready for operation.

The modified construction shown in FIG. 6 includes the same parts 14 and 15 as does the construction of FIGS. 3 to 5, part 14 being not shown in FIG. 6. Additionally, there is a metal ring 26 which covers the frontal face 27 of the flange 24. The ring 26 is secured in place by turning the edge portion at 28 (see FIG. 7) around the end portion 29 of the flange 24. The metal ring 26 is thus permanently secured to the ring 15, and in assembling the modified construction, the ring 15 having the metal ring 26 secured thereto is used instead of the plain ring 15. The metal ring 26 offers the advantage of protecting the frontal face 27 of the flange 24 and thus the flange 24 from wear.

It is believed that the construction and operation of a preferred form of a device for practicing the invention, and the many advantages thereof, will be clearly understood from the foregoing description. Additionally, it is pointed out that my device does not rely for its operation exclusively on a hair clipper. Any attachment that would fit, for instance, a power-driven drill, and is also suited to fit the cavity of the body of my device will make it possible to operate my device. It will be apparent that although two sanding disks have been shown only one such disk is used at any one time to do the grooming. Any number of thin disks may be sandwiched between the face 22 and the flange 24 to store as in a magazine the disks which are not used. My construction offers the great advantage of exposing a relatively large and unobstructed sanding surface to be used to file an animal's nails, which is due to the sanding disk being sandwiched between the face 22 and the flange 24. There is no danger of injuring the animal.

It will be apparent that while I have shown and described my invention in a single form only, many changes and modifications may be made without departing from the spirit of the invention defined in the following claim.

I claim:

A device for grooming nails of animals, comprising
(a) a revolvable worm,
(b) a body of circular cross-sections and resilient material, and having a longitudinal axis, a side wall, a first flat end face, a second flat end face, and a cavity throughout of cylindrical shape, at least a portion of said side wall being of cylindrical shape, said first and second end faces being opposite each other, said cavity opening in said second end face and extending axially from said second end face to a plane parallel to and spaced from said first end face, said worm being received in said cavity, said cavity being of a size and being shaped to frictionally retain said worm therein,
(c) at least a single sanding disk lying against said first end face, and
(d) ring means of resilient material, frictionally enclosing said cylindrical side wall portion, and having an end flange turned inwardly to fit tightly over a marginal portion of said disk.

References Cited by the Examiner

UNITED STATES PATENTS

| | | | |
|---|---|---|---|
| 883,920 | 4/08 | Stoll | 132—73.6 X |
| 1,450,612 | 4/23 | Shultz | 32—58 |
| 1,561,998 | 11/25 | Pringle | 51—170.2 |
| 1,709,591 | 4/29 | Newbound | 132—73.6 |
| 2,017,881 | 10/35 | Wiseman | 32—59 |
| 2,447,102 | 8/48 | Strand | 51—197 |
| 2,479,726 | 8/49 | Czarnota | 51—187 |
| 2,597,525 | 5/52 | Kessler | 132—75.8 |
| 2,922,261 | 1/60 | Rabkin et al. | 51—170.2 |
| 2,974,984 | 3/61 | Koch. | |
| 2,991,596 | 7/61 | Walters | 51—187 |

RICHARD A. GAUDET, *Primary Examiner.*

JORDAN FRANKLIN, *Examiner.*